United States Patent
Shi et al.

(10) Patent No.: US 6,272,476 B1
(45) Date of Patent: Aug. 7, 2001

(54) PROGRAMMABLE AND EXPANDABLE FUZZY PROCESSOR FOR PATTERN RECOGNITION

(75) Inventors: Bingxue Shi; Gu Lin, both of Beijing (CN)

(73) Assignee: Winbond Electronics Corp, Hsinchu (TW)

(*) Notice: Subject to any disclaimer, the term of this patent is extended or adjusted under 35 U.S.C. 154(b) by 0 days.

(21) Appl. No.: 09/292,124

(22) Filed: Apr. 14, 1999

(51) Int. Cl.[7] ........................................................ G06F 9/45
(52) U.S. Cl. ........................ 706/1; 706/4; 706/5; 382/181; 382/224
(58) Field of Search ...................... 706/1, 4, 5; 382/224, 382/181

(56) References Cited

U.S. PATENT DOCUMENTS

| | | | |
|---|---|---|---|
| 5,179,668 | * | 1/1993 | Ejima et al. ............................ 710/36 |
| 5,357,449 | * | 10/1994 | Oh ........................................ 706/900 |
| 5,495,558 | * | 2/1996 | Tashima ................................ 706/52 |
| 5,561,738 | * | 10/1996 | Kinerk et al. .......................... 706/4 |
| 5,604,842 | * | 2/1997 | Nishidai ................................ 706/52 |
| 5,638,490 | * | 6/1997 | Eckert et al. .......................... 706/4 |
| 5,724,483 | * | 3/1998 | Gianguido et al. .................... 706/8 |
| 5,732,191 | * | 3/1998 | Kunemund et al. .................... 706/8 |
| 5,790,755 | * | 8/1998 | Pagni et al. ............................ 706/4 |
| 5,799,132 | * | 8/1998 | Rizzotto et al. ........................ 706/4 |
| 5,802,204 | * | 9/1998 | Basehore ............................... 382/186 |
| 5,805,774 | * | 9/1998 | Viot et al. ............................. 706/7 |
| 5,809,486 | * | 9/1998 | Cuce ..................................... 706/3 |
| 5,867,386 | * | 2/1999 | Hoffberg et al. ...................... 700/83 |
| 5,870,495 | * | 2/1999 | Mancuso et al. ...................... 382/199 |
| 5,915,247 | * | 6/1999 | Pappalardo et al. .................. 706/8 |
| 5,918,221 | * | 6/1999 | Manaresi et al. ...................... 706/9 |
| 5,943,664 | * | 8/1999 | Abruzzese et al. .................... 706/52 |
| 6,035,385 | * | 3/2000 | Le Van Suu ........................... 706/1 |
| 6,061,672 | * | 5/2000 | Caponetto et al. .................... 706/2 |
| 6,185,331 | * | 2/2001 | Shi et al. ............................... 706/1 |
| 6,188,998 | * | 2/2001 | Cuce' et al. ........................... 706/7 |
| 6,205,438 | * | 3/2001 | Shi et al. ............................... 706/5 |

OTHER PUBLICATIONS

Li et al.; "A Modified Current Mode Hamming Neural Network for Totally Unconstrained Handwritten Numeral Recognition". IEEE[online], The 1998 IEEE Joint Conference on Neural Networks, May 1998, vol. 3, pp. 1857–1860.*

(List continued on next page.)

*Primary Examiner*—Mark R. Powell
*Assistant Examiner*—Kevin Booker
(74) *Attorney, Agent, or Firm*—Kolisch Hartwell Dickinson McCormack & Heuser

(57) ABSTRACT

A fuzzy processor which can be programmed and expanded is disclosed. The fuzzy processor has a membership function I/O circuit for inputting and outputting a plurality of membership functions respectively corresponding to each one of a plurality of features of each one of a plurality of standard patterns. A feature decoder receives a to-be-recognized pattern having a plurality of input features for generating a plurality of feature values. A membership function generator stores the plurality of membership functions and receives the plurality of feature values to generate a plurality of current-type membership degrees for the plurality of input features corresponding to the plurality of standard patterns respectively. A plurality of accumulators receive the plurality of current-type membership degrees respectively for generating a plurality of synthesis membership degrees. An expandable synthesis membership degree comparing circuit is provided for receiving the plurality of synthesis membership degrees from the plurality of accumulators to output said plurality of synthesis membership degrees as well as the corresponding standard patterns in an order of magnitude.

11 Claims, 5 Drawing Sheets

OTHER PUBLICATIONS

Liu et al.; "A Multi–Input Fuzzy Processor for Pattern Recognition". IEEE[online], International Conference on Solid–State and Integrated Circuit Technology, Oct. 1995, pp. 112–114.*

Lin et al.; "A Novel Current–Mode Fuzzy Processor for Pattern Recognition". IEEE[online], 1998 Fourth International Conference on Signal Processing Proceedings, Oct. 1998, vol. 1, pp. 541–544.*

Gabrielli et al.; "VLSI Design and Realisation of a 4 Input High Speed Fuzzy Processor". IEEE[online], Proceedings of the Sixth IEEE International Conference on Fuzzy Systems, Jul. 1997, vol. 2, pp. 779–785.*

Ascia et al.; "A Dedicated Parallel Processor for Fuzzy Computation". IEEE[online], Proceedings of the Sixth IEEE International Conference on Fuzzy Systems, Jul. 1997, vol. 2, pp. 787–792.*

Ascia et al.; "Design of a VLSI Parallel Processor for Fuzzy Computing". IEEE[online], Proceedings of the 8th International Conference on VLSI Design, Jan. 1995, pp. 315–320.*

* cited by examiner

PROGRAMMABLE AND EXPANDABLE FUZZY PROCESSOR FOR PATTERN RECOGNITION

BACKGROUND OF THE INVENTION

1. Field of the Invention

The present invention relates to a fuzzy processor for pattern recognition, more particularly, to a programmable and expandable fuzzy processor for comparing a to-be-recognized pattern with a plurality of standard patterns.

2. Description of Related Art

The idea of fuzzy logic was introduced by L. A. Zadeh in 1965, which plays an important role in the field of computer science and has been successfully applied in many applications. Fuzzy logic is commonly implemented in computer software. However, because software fuzzy logic can not satisfy many applications requiring real-time processing, a design for hardware fuzzy logic has become an important research initiative.

Because of the imprecise, vague and incomplete nature of available information about a collection of objects, people usually has to proceed in fuzzy inference and judgement, which forms the physical basis for the fuzzy mathematics applied in pattern recognition. The principle rule of fuzzy pattern recognition is the maximum membership degree rule. In actual application, a standard pattern usually has a plurality of fuzzy features. If there are n standard patterns each having m fuzzy features and the jth fuzzy feature of the ith pattern is Aij, where $i=1,2,\ldots,n; j=1,2,\ldots,m$, then each standard pattern Ai is a fuzzy vector Ai=<Ai1, Ai2, ...., Aim>, $1<i<n$. Assuming that $u=(u_1, u_2, \ldots, U_m)$ is a pattern to be recognized, each member of u, that is each $u_j$, corresponds to a fuzzy feature. If there exists an $i \in \{1,2,\ldots,n\}$ such that $\mu_{Ai}(u) = \max\{\mu_{A1}(u), \mu_{A2}(U), \ldots, \mu_{An}(u)\}$ then u relatively belongs to Ai, wherein it is assumed that $\mu_{Ai}(u) = M_m(\mu_{Ai1}(u_1), \mu_{Ai2}(u_2), \ldots, \mu_{Aim(um)})$, and $M_m( )$ is a synthesis function.

The above expression of $\mu_{Ai}(u)=\max\{\mu_{A1}(u),\mu_{A2}(u),\ldots, \mu_{An}(u)\}$ discloses the recognition rule for conventional fuzzy pattern having multiple features. Currently, most of the hardware implementations for fuzzy pattern recognition are based on the rule which only finds the closest standard pattern for the to-be-recognized pattern. However, with the rise in system complexity, the increase in the number of standard patterns and especially the development of expanded systems with multiple stages, the above hardware implementation of fuzzy logic appears to be unsatisfactory. To enhance the system performance, it is necessary to find two or more of the closest standard patterns for the to-be-recognized pattern according to the synthesis membership degrees between the to-be-recognized pattern and the standard patterns. Therefore, a novel fuzzy processor is set forth hereinafter, which can sequentially output the synthesis membership degrees as well as the corresponding standard patterns in an order of magnitude. Accordingly, the h closest standard patterns can be found sequentially where $1 \leq h \leq n$. This will greatly improve the system performance by increasing the recognition rate and reprocessing and reusing data in a multi-stage expanded system.

There are many choices for the synthesis functions. The most frequently used are the minimum-finding function, $\wedge_j (X) = \wedge_j x_j$ for j=1 to m, and the summation function, $\Sigma X = \Sigma x_j$ for j=1 to m. The minimum-finding function is not suitable for pattern recognition since it only emphasizes a local feature and neglects the other features. The summation function is able to include the effects of all features whereby it is suitable for pattern recognition. Therefore, the summation function is adopted by the fuzzy processor in accordance with the present invention.

SUMMARY OF THE INVENTION

One object of the present invention is to provide a fuzzy processor which can be programmed to satisfy the requirements in different applications.

Another object of the present invention is to provide a fuzzy processor which can be expanded to enhance its adaptability in various applications.

In accordance with one aspect of the present invention, the fuzzy processor comprises a membership function I/O circuit for inputting and outputting a plurality of membership functions respectively corresponding to each one of a plurality of features of each one of a plurality of standard patterns, a feature decoder for receiving a to-be-recognized pattern having a plurality of input features for generating a plurality of feature values, a membership function generator for storing the plurality of membership functions and receiving the plurality of feature values to generate a plurality of current-type membership degrees for the plurality of input features corresponding to the plurality of standard patterns respectively, a plurality of accumulators for receiving the plurality of current-type membership degrees respectively for generating a plurality of synthesis membership degrees, and an expandable synthesis membership degree comparing circuit for receiving the plurality of synthesis membership degrees from the plurality of accumulators to output said plurality of synthesis membership degrees as well as the corresponding standard patterns in an order of magnitude. Other objects, advantages, and novel features of the invention will become more apparent from the following detailed description when taken in conjunction with the accompanying drawings.

DETAILED DESCRIPTION OF PRFFERREFD EMBODIMENT

Figure 1:
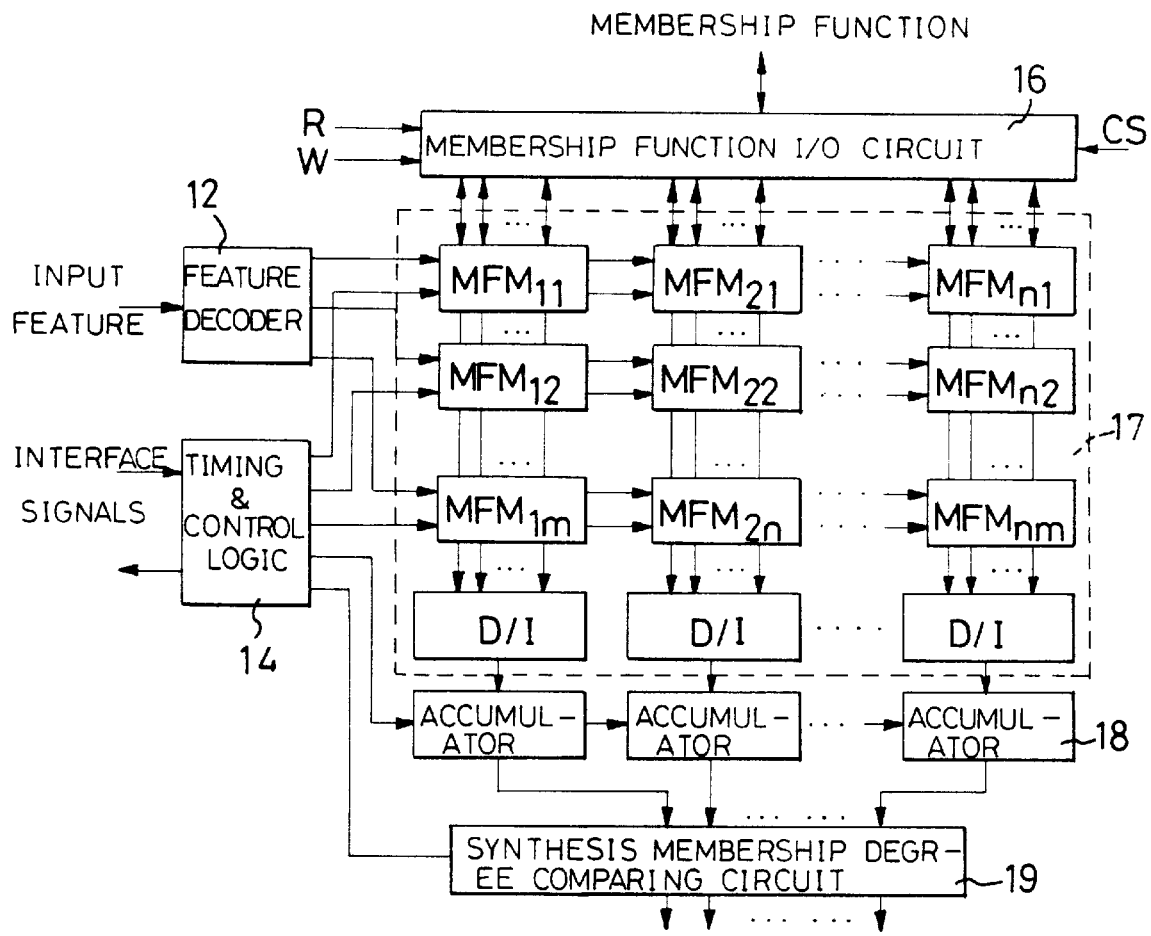
FIG. 1 is a block diagram of a fuzzy processor in accordance with the present invention.

Referring to FIG. 1, a hybrid current-type fuzzy processor in accordance with the present invention is shown, which comprises a feature decoder (12), timing and control logic (14), a membership function I/O circuit (16), a membership function generator (17), a plurality of accumulators (18) and a synthesis membership degree comparing circuit (19). In the membership function generator (17), $MFM_{ij}$ ($1 \leq i \leq n$, $1 \leq j \leq m$) stands for a membership function memory unit corresponding to the jth feature of the ith standard pattern and D/I is a current-type digital/analog converter. R and W are signals to control the membership function I/O circuit (16) for reading and writing membership functions. CS is a chip select signal to enable the membership function I/O circuit (16). The digital circuit portion of the fuzzy processor, which includes the feature decoder (12), the timing and control logic (14), the membership function I/O circuit (16) and the membership generator (17), is used to store membership functions, to decode input features and to generate the timing and control signals for the fuzzy processor. The analog portion of the fuzzy processor, which includes the accumulators (18) and the synthesis membership degree comparing circuit (19), is used to process fuzzy data and output recognition results.

Figure 2:
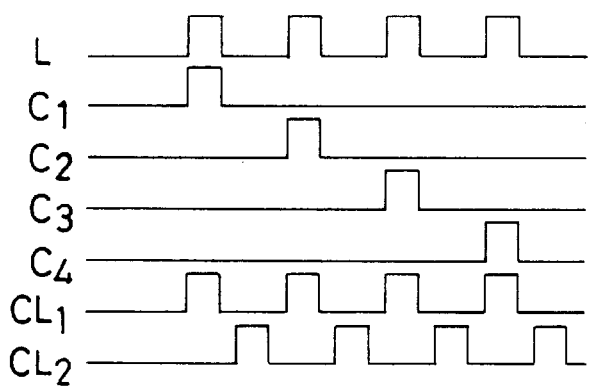
FIG. 2 is a timing diagram for the fuzzy processor in accordance with the present invention.

FIG. 2 gives a timing diagram for the fuzzy processor. To recognize a pattern, its corresponding m features are input to the feature decoder (12). Assuming that a feature is of a k-digit binary code and thus there are $2^k$ possible feature values, from 0 to $2^k-1$, for one feature. In order to reduce the number of pins on a fuzzy processor chip and to share one feature decoder (12), the m features of the pattern to be recognized are input to the feature decoder (12) in a time shared manner under the control of a signal L shown in FIG. 2 by taking k=5 and m=4 for example. To program the fuzzy processor, CS is set active to enable the I/O circuit (16) for data exchange. Under the control of the W signal, the output of the feature decoder (12) and the timing signal $C_j$ ($1 \leq j \leq m$, m=4) ($C_j$ is described hereinafter), the membership functions of the standard pattern can be written into the membership function memory units. It is also possible to read out the membership functions for verification by utilizing the R signal. To recognize a pattern, CS is set inactive to disable the I/O circuit (16), and the features of a to-be-recognized pattern are input and decoded by the feature decoder (16) to select the corresponding membership function memory units. The currents representing membership degrees corresponding to n (n=11 for example) standard patterns for each feature are then obtained through the D/I converters. The current-type accumulators (18) accumulate the membership degrees for all features in a time-shared way to obtain the synthesis membership degrees corresponding to the n standard patterns. Finally, a synthesis membership comparing circuit (19) is provided to output the synthesis membership degrees as well as the corresponding standard patterns in an order of magnitude as a recognition result.

The I/O circuit (16), the feature decoder (12) and the timing and control logic (14) in FIG. 1 can be implemented by well known digital circuits and therefore will not be described.

The membership function generator (17) is constituted by the MFM units and the D/I converters wherein each MFM unit stores a membership function of one of the standard patterns whereby the membership function can be programmed for different applications. When the fuzzy processor is in pattern recognition, the MFM units generate corresponding membership degrees in digital type according to the input to-be-recognized pattern. Then the D/I converters convert the digital-type membership degrees into current-type membership degrees for processing.

Figure 3:
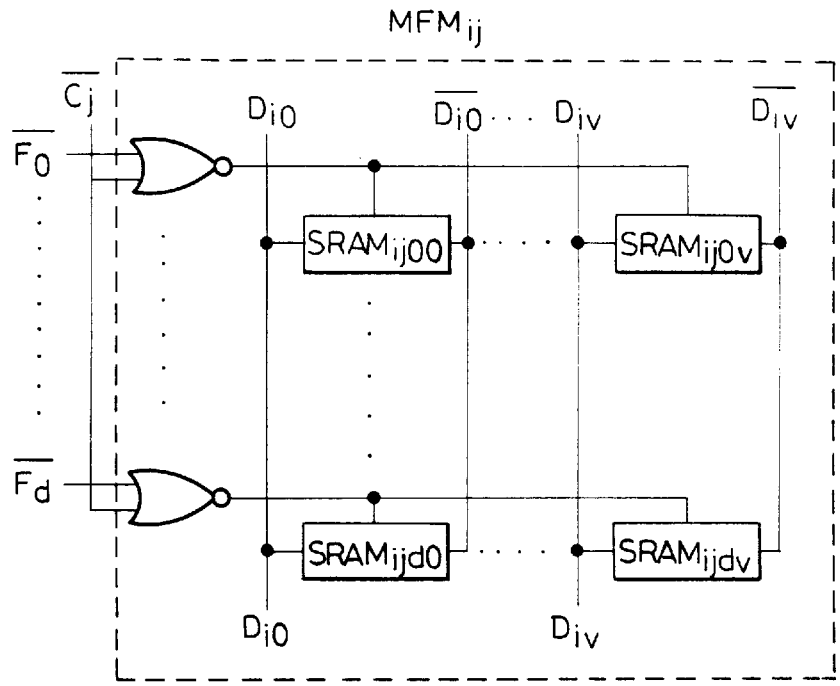
FIG. 3 is a circuit diagram of a membership function memory unit of the fuzzy processor in accordance with the present invention.
Figure 4:
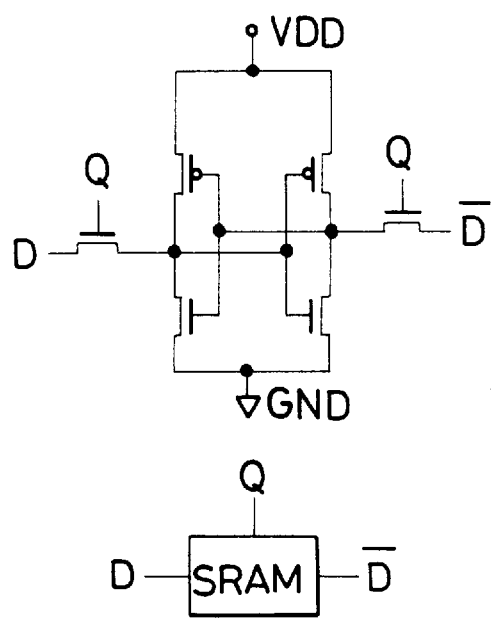
FIG. 4 is a circuit diagram of a SRAM unit having six terminals.

The circuit diagram of a MFM unit is shown in FIG. 3, wherein $MFM_{ij}$ ($1 \leq i \leq n$, $1 \leq j \leq m$) is the membership function memory unit corresponding to the jth feature of the ith standard pattern, which is constituted by the six-terminal SRAM (Static Random Access Memory) unit as shown in FIG. 4. In FIG. 3, $SRAM_{ij1s}$ ($1 \leq i \leq n$, $1 \leq j \leq m$, $0 \leq 1 \leq d$, $d=2^k-1$, $0 \leq s \leq v$) stands for a SRAM unit which stores the sth digit of the digital-type membership degree corresponding to the Ith feature value of the jth feature of the ith standard pattern, wherein the membership degree is of v+1 digits. The MFM units are addressed by the output signal $F_1$ ($0 \leq 1 \leq d$, $d=2^k-1$) from the feature decoder (12) in combination with the timing signal $C_j$ ($1 \leq j \leq m$). As shown in FIG. 2, the timing signal $C_j$ ($1 \leq j \leq m$) comprises several adjacent but non-overlapped clock pluses, each corresponding to an input feature. In FIG. 3, $\sim C_j$ ($1 \leq j \leq m$) is the reverse signal of $C_j$, $\sim F_1$ ($0 \leq 1 \leq d$, $d=2^k-1$) is the reverse signal of $F_1$, and $D_{i0} \sim D_{iv}$ are the outputs of the digital-type membership degrees of the ith standard pattern.

Figure 5:
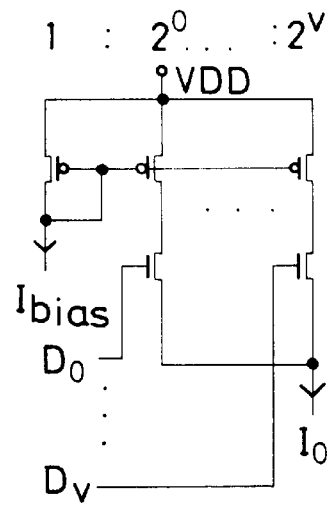
FIG. 5 is a circuit diagram of a current-type digital/analog converter of the fuzzy processor in accordance with the present invention.

The circuit diagram of a current-type D/I converter is shown in FIG. 5 wherein $D_0 \sim D_v$ are outputs of a MFM unit and $I_{bias}$ is offset current. The output current $I_0$ of the D/I converter can be expressed by $I_0 = (D_0 2^0 + D_1 2^1 + \ldots + D_v 2^v) \times I_{bias}$. Accordingly, the digital-type membership degree can be converted into a current-type membership degree by using the D/I converter.

Figure 6:
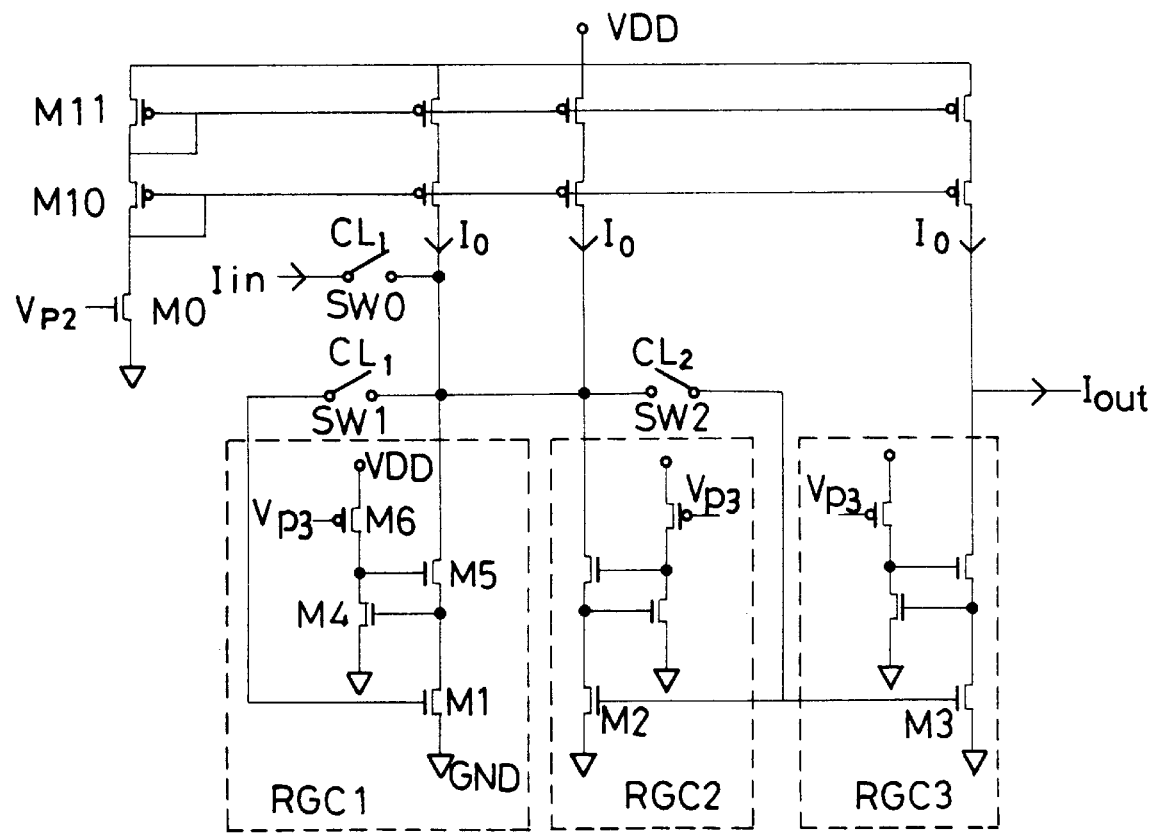
FIG. 6 is a is a circuit diagram of an accumulator of the fuzzy processor in accordance with the present invention.

The accumulator (18) is of switched-current type to accumulate the current-type membership degrees. The switched-current technology was introduced by Hughes et al. in 1989. The switched-current circuit uses MOS transistors as storage units and thus can be implemented by standard digital CMOS technology thereby making the integration of digital and analog circuits and the implementation of VLSI easy. In the present invention, the switched-current type accumulator (18) is used to accumulate the membership degree current $I_{in}$ in a time-shared way to obtain the current-type synthesis membership degree, wherein $I_{in}$ is the current output of the D/I converter. The circuit diagram of an accumulator (18) is shown in FIG. 6, which uses second generation switched-current storage to overcome the disadvantages of first generation switched-current storage. To stabilize the drain voltage of a storage transistor, a RGC (Regulated-Gate Cascade) structure is adopted to construct a storage unit such as the RGC1, RGC2 or RGC3 unit shown in FIG. 6. The corresponding transistors of the three RGC units are the same size. In addition, SW0, SW1 and SW2 are switches controlled by two non-overlapped clocks $CL_1$ and $CL_2$ shown in FIG. 2. $V_{p2}$ and $V_{p3}$ in FIG. 6 are offset voltages.

Assuming that $I_{in}$ is the input current and $I_{out}$ is the output current, the z-transform function between $I_{in}$ and $I_{out}$ can be derived as $I_{out} = I_{in} \times z^{-1}/(1-z^{-1})$. From this z-transform function, it is known that the accumulator (18) is capable of performing an accumulation operation because of having an integration characteristic.

The synthesis membership degree comparing circuit (19) is used to compare and sort the synthesis membership degree currents corresponding to the n standard patterns and the to-be-recognized pattern to sequentially output high voltage pulses on the outputs corresponding to the n standard patterns in an order of magnitude of the current as a recognition result. Further concerning the chip expansion application in which M processor chips (each can recognize N standard patterns) are connected in parallel to recognize M×N standard patterns, the synthesis membership degree comparing circuit (19) has to compare and sort M×N synthesis membership degrees. Thus the synthesis membership degree circuit (19) must be expandable. Accordingly, the synthesis membership degree circuit (19) is capable of sorting and expansion functions.

Figure 7:
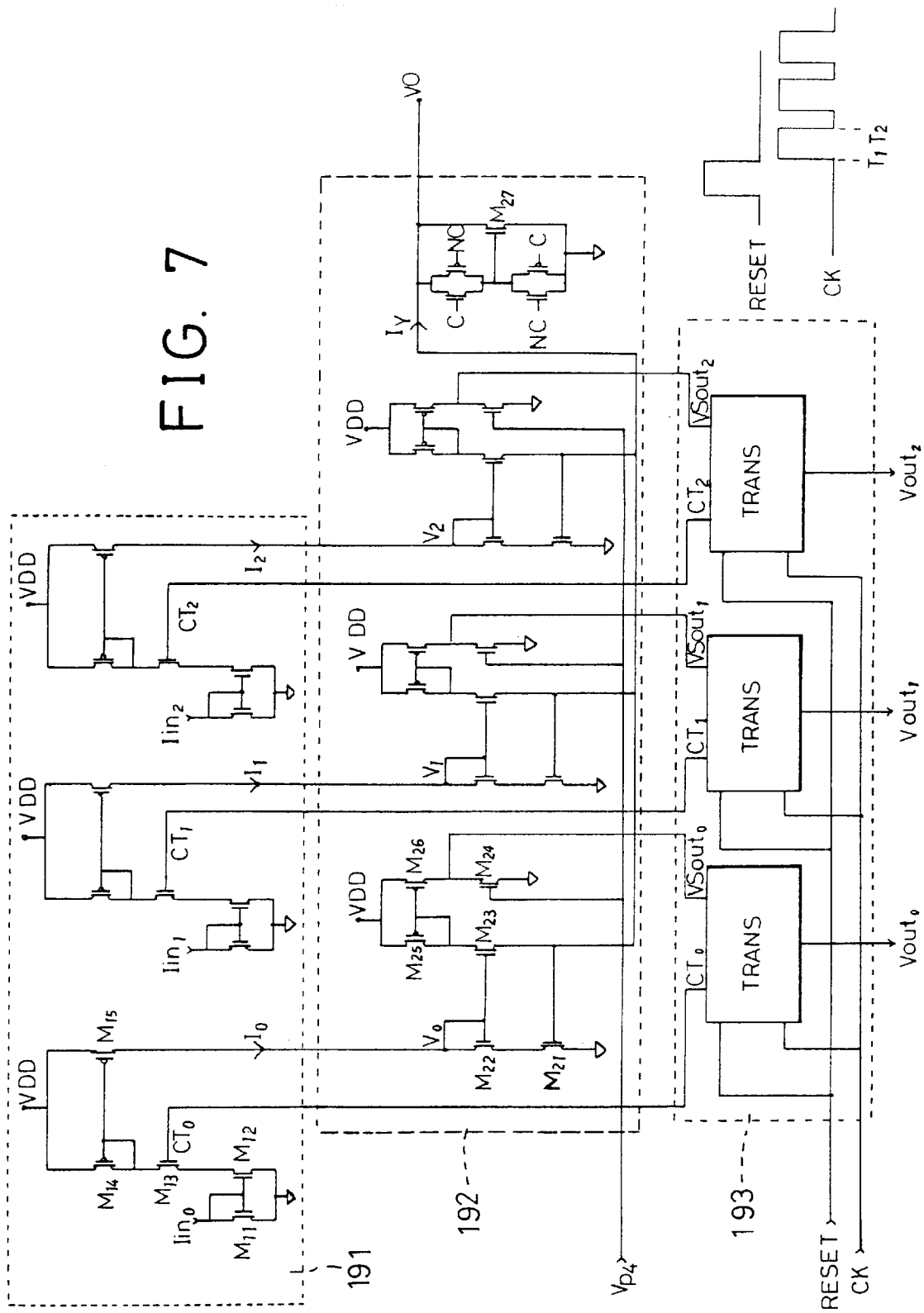
FIG. 7 shows a circuit diagram of an expandable synthesis membership degree comparing circuit of the fuzzy processor in accordance with the present invention and a timing diagram for controlling the expandable synthesis membership degree comparing circuit.
Figure 8:
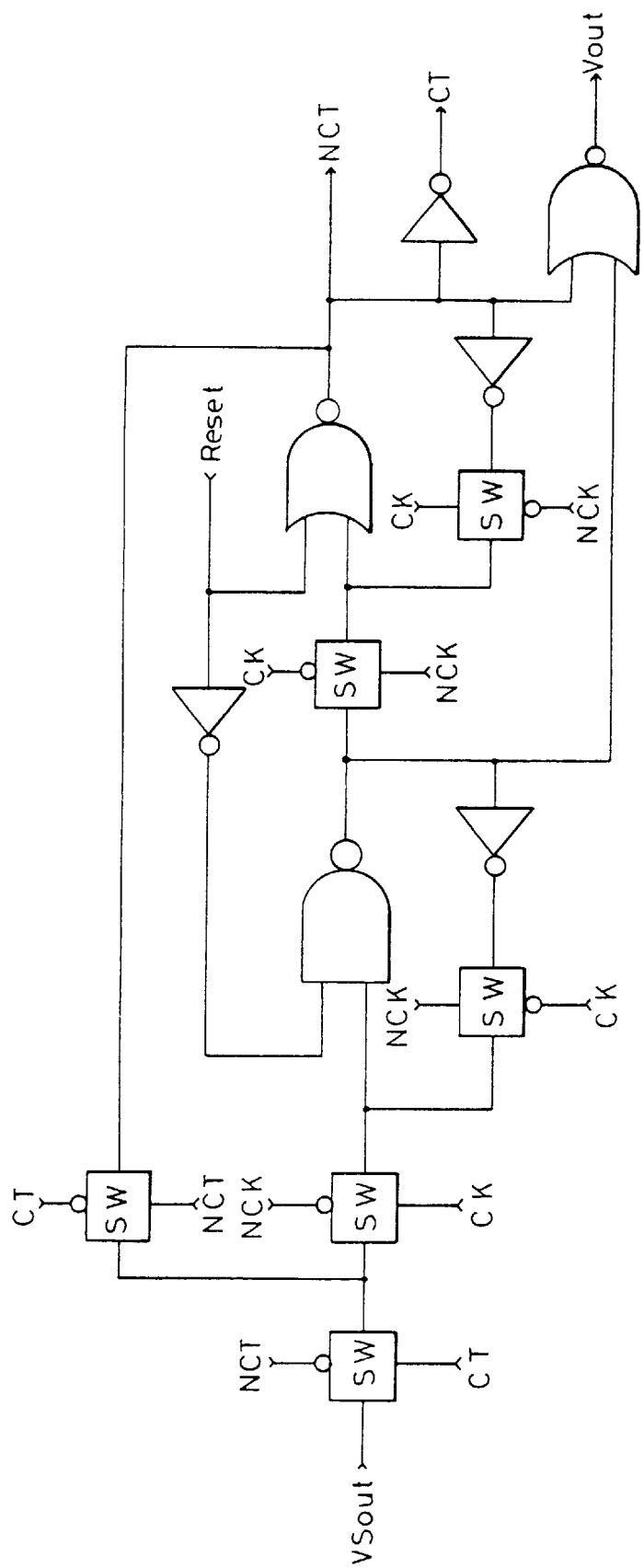
FIG. 8 is a circuit diagram of a transfer unit of the expandable synthesis membership degree comparing circuit.

For convenience, a synthesis membership degree comparing circuit (19) with three current inputs is provided as an example. FIG. 7 shows the circuit and timing diagrams for this exemplary synthesis membership degree comparing circuit (19) which includes an input circuit unit (191), a WTA (winner-take-all) circuit unit (192) and a feedback control and voltage output unit (193). The input circuit unit (191) comprises three identical input units where $Iin_i$ ($0 \leq i \leq 2$) designate three input currents representing three synthesis membership degrees which are directed and output to the WTA circuit unit (192). The WTA circuit unit (192) receives the input currents from the input circuit unit (191) to find the maximum current among them and output three voltage signals $VSout_i$ ($0 \leq i \leq 2$) indicating the maximum one. The feedback control and voltage output circuit unit (193) comprises three identical transfer units (TRANS). The circuit diagram for each transfer unit is shown in FIG. 8 which generates feedback control signals $CT_i$ ($0 \leq i \leq 2$) according to $VSout_i$ ($0 \leq i \leq 2$) to control the output currents of the input circuit unit (191).

The synthesis membership degree comparing circuit (19) is provided with a single operational mode and an expanded operational mode. In the single operational mode, a processor chip having N current inputs is operated independently to compare and sort N currents. In the expanded operational mode, M processor chips, each having N current inputs, are connected in parallel to compare and sort M×N currents. The operations of the processor chip are described below. Referring to FIG. 7 again, in the single operational mode, the VO terminal is floating and the control terminal C is set to high which cause the gate and drain of the MOS transistor $M_{27}$ short-connected whereby the transistor $M_{27}$ works in the saturation region. With reference to the timing diagram in FIG. 7, the high of the signal RESET cause the $Vout_i$ ($0 \leq i \leq 2$) in the feedback control and voltage unit (193) to low and $CT_i$ ($0 \leq i \leq 2$) to high, which results that $I_i$ ($0 \leq i \leq 2$)=$Iin_i$ ($0 \leq i \leq 2$) in the input circuit unit (191). Furthermore, the high of CT enables the feedback control and voltage unit (193) to sample the outputs of the WTA circuit unit (192). The WTA circuit unit (192) is a fully symmetrical three-input WTA circuit in which the dimensions of all the NMOS transistors corresponding to the transistors $M_{21}$, $M_{22}$ and $M_{23}$ are identical. The width to length ratio (W/L) of $M_{27}$ is the same as that of $M_{21}$. When the WTA circuit unit (192) is in operation, voltages $V_0$, $V_1$ and $V_2$ are established respectively by the input current $I_0$, $I_1$ and $I_2$. For convenience, assuming $I_0$=max ($I_0$, $I_1$, $I_2$), we have $V_0$=max ($V_0$, $V_1$, $V_2$). Apparently, transistors $M_{23}$ and corresponding NMOS transistors constitute a differential circuit, and voltages $V_0$, $V_1$ and $V_2$ are input voltages to the differential circuit. When $|V_0-V_i|>(2I_y/\beta)^{1/2}$ for i=1, 2 is satisfied, where $\beta=[\mu C_{ox}/2](W/L)$ and W/L is the width to length ratio of $M_{27}$, $I_y$ flows through a differential transistor having the maximum input voltage; that is, the drain current of $M_{23}$ is $I_y$ and the drain currents of the other corresponding differential transistors are zero. Therefore, $VSout_0$ is high and $VSout_1$ and $VSout_2$ are low so that the maximum-finding operation is completed. At T1, clock signal CK becomes high. In the feedback control and voltage output unit (193), the high $VSout_0$ causes $Vout_0$ to be high while $Vout_1$ and $Vout_2$ remain low due to the low voltage levels of $VSout_1$ and $VSout_2$. At T2, clock signal CK becomes low. In the feedback control and voltage output unit (193), the low CK causes $Vout_0$ and $CT_0$ to be low while $Vout_1$ and $Vout_2$ remain low and $CT_1$ and $CT_2$ remain high. Thus, a high voltage pulse is generated on the $Vout_0$ terminal. On the other hand, the low $CT_0$ isolates a portion of the feedback control and voltage output unit (193) corresponding to $Iin_0$ from the WTA circuit unit (192) whereby $Vout_0$ and $CT_0$ always remain low until the next RESET signal is inserted. In the input circuit unit (191), the low $CT_0$ turns $M_{13}$ off resulting in $I_0$ being zero, whereby $I_0$ will not influence the sequential operations. Similarly, the second maximum current is determined by the process described above and a high voltage pulse is also generated on the corresponding Vout terminal. In this manner, all of the input currents are sorted in an order of magnitude under the control of the clock signals. Meanwhile, high voltage pulses are sequentially generated on the corresponding Vout terminals. These high voltage pulses are the result of recognition.

In the expanded mode, the fuzzy processor is able to sort M×N currents by connecting M processor chips, each having a synthesis membership degree comparing circuit (19) with N current inputs. In this mode, the RESET terminals, the CK terminals and the VO terminals of the M processor chips are connected together respectively. Meanwhile, one of the control terminals C is set to high and the others are set to low. For convenience, taking N=3 and M=2 for example, the control terminal $C_1$ of processor chip 1 is set to high and the control terminal $C_2$ of processor chip 2 is set to low. Referring to FIG. 7 again, the gate voltage of the NMOS transistor $M_{27}$ in processor chip 2 is low; that is, the $M_{27}$ of processor chip 2 does not have any effect on sorting operations. Thus, one $M_{27}$ is shared by two processor chips. Obviously, the two independent three-input synthesis membership degree comparing circuits (19) have been merged to one six-input synthesis membership degree comparing circuit (19). The operation of this six-input synthesis membership degree comparing circuit (19) is the same as that of the three-input synthesis membership degree comparing circuit (19) described above. That is, the expanded synthesis membership degree comparing circuit (19) sequentially outputs corresponding high voltage pulses on $Vout_i$ ($0 \leq i \leq 5$) according to the magnitudes of the input currents $Iin_i$ ($0 \leq i \leq 5$).

From the previous description, it is clear that the fuzzy processor is able to determine and output the standard patterns in an order of the magnitude of the synthesis membership degree. Because the synthesis membership degree circuit (19) is operated under timing signals, it is possible to select m of the closet standard patterns by setting the number of pulses in clock CK to be m ($1 \leq m \leq N$). For example, if m=1, the recognition rule of the fuzzy processor of the present invention is simplified to be the one described in the related art which simply outputs the standard pattern that is closest to the to-be-recognized pattern. If m=N, the fuzzy processor outputs all the standard patterns and the corresponding synthesis membership degrees in an order of magnitude.

As the accumulator (18) and the synthesis membership degree comparing circuit (19) are the kernels of the fuzzy processor in accordance with the present invention, tests are made to the accumulator (18) and the synthesis membership degree comparing circuit (19) for evaluating their performance. The accumulator (18) and the synthesis membership degree comparing circuit (19) for test are fabricated using 2 $\mu$m N-well standard digital CMOS technology with a single metal layer and a single polysilicon layer. Table 1 and Table 2 give the test results indicating the main characteristics of the accumulator (18) and the synthesis membership degree comparing circuit (19), respectively. The tests show that these kernels are functionally correct and have excellent performance thereby satisfying the requirement of the fuzzy processor.

TABLE 1

| highest operating frequency | 2 MHz |
|---|---|
| standard operating voltage | +5 V |
| average accumulated error | about 2 μA |
| output current swing | 10 μA~200 μA |
| power dissipation | about 5 mW |

TABLE 2

| operating frequency | more than 5 MHz |
|---|---|
| standard operating voltage | +5 V |
| average sorting discriminating rate | about 5 μA |
| highest sorting discriminating rate | 2 μA |
| average sorting precision degree | about 10 μA |
| range of input current | 15 μA~280 μA |

Although the present invention has been explained in relation to its preferred embodiment, it is to be understood that many other possible modifications and variations can be made without departing from the spirit and scope of the invention as hereinafter claimed.

What is claimed is:

1. A fuzzy processor for operating with a plurality of standard patterns each having a plurality of features, said fuzzy processor comprising:
   a membership function I/O circuit for inputting and outputting a plurality of membership functions respectively corresponding to each one of said plurality of features of each one of said plurality of standard patterns;
   a feature decoder for receiving a to-be-recognized pattern having a plurality of input features, and generating a plurality of feature values;
   a membership function generator for storing said plurality of membership functions and receiving said plurality of feature values to generate a plurality of current-type membership degrees for said plurality of input features corresponding to said plurality of standard patterns, respectively;
   a plurality of accumulators for receiving said plurality of current-type membership degrees respectively and generating a plurality of synthesis membership degrees; and
   an expandable synthesis membership degree comparing circuit for receiving said plurality of synthesis membership degrees from said plurality of accumulators and outputting said plurality of synthesis membership degrees as well as the corresponding standard patterns in an order of magnitude.

2. The fuzzy processor as claimed in claim 1, wherein said membership function generator comprises:
   a plurality of membership function memory units respectively corresponding to each one of said plurality of features of each one said plurality of standard patterns respectively for storing said plurality of membership functions and addressed by said plurality of feature values to generate a plurality of membership degrees for said plurality of input features corresponding to said plurality of standard patterns, respectively; and
   a plurality of current-type digital/analog converters corresponding to said plurality of standard patterns respectively for receiving said plurality of membership degrees and generating a plurality of current-type membership degrees.

3. The fuzzy processor as claimed in claim 2, wherein said membership function I/O circuit is enabled by activating a chip select signal to write said plurality of membership functions into said plurality of membership function memory units respectively.

4. The fuzzy processor as claimed in claim 3, wherein each one of said plurality of membership function memory units includes a plurality of static random access memory units.

5. The fuzzy processor as claimed in claim 4, wherein each one of said plurality of accumulators includes a plurality of storage units constructed by a Regulated-Gate Cascade structure.

6. The fuzzy processor as claimed in claim 5, wherein said expandable synthesis membership degree comparing circuit comprises:
   an input circuit unit having a plurality of inputs for receiving a plurality of currents representing said plurality of synthesis membership degrees and having a plurality of outputs for outputting at least one of said plurality of currents;
   a winner-take-all (WTA) circuit unit receiving said plurality of currents from said input circuit for establishing a plurality of representing voltages corresponding thereto wherein the maximum one among said plurality of representing voltages generates a representing current controlled by a control terminal to be output on a VO terminal, and generating a plurality of first voltage output signals respectively corresponding to the received plurality of currents for indicating said maximum current; and
   a feedback control and voltage output unit having a clock terminal for receiving a clock signal, receiving said plurality of first voltage output signals from said winner-take-all circuit unit, generating a plurality of feedback control signals according to said plurality of first voltage output signals in one operation cycle controlled by said clock signal to control the outputs of said input circuit unit wherein one of said plurality of feedback control signals corresponding to the first voltage output signal indicative said maximum current is set inactive for guiding said input circuit unit to clear a corresponding input current, and converting said plurality of first voltage output signals to a plurality of second voltage output signals on said plurality of outputs in said operation cycle; a reset terminal being provided for receiving reset signals to reset said feedback control and voltage output unit.

7. A fuzzy processor for operating with a plurality of standard patterns each having a plurality of features, said fuzzy processor comprising:
   a membership function I/O circuit for inputting and outputting a plurality of membership functions respectively corresponding to each one of said plurality of features of each one of said plurality of standard patterns;
   a feature decoder for receiving a to-be-recognized pattern having a plurality of input features, and generating a plurality of feature values;
   a plurality of membership function memory units respectively corresponding to each one of said plurality of features of each one of said plurality of standard patterns for storing said plurality of membership functions and addressed by said plurality of feature values to generate a plurality of membership degrees for said plurality of input features corresponding to said plurality of standard patterns, respectively;
   a plurality of current-type digital/analog converters corresponding to said plurality of standard patterns respectively for receiving said plurality of membership degrees and generating a plurality of current-type membership degrees;

a plurality of accumulators corresponding to said plurality of converters for receiving said plurality of current-type membership degrees and generating a plurality of synthesis membership degrees; and an expandable synthesis membership degree comparing circuit including:

an input circuit unit having a plurality of inputs for receiving a plurality of currents representing said plurality of synthesis membership degrees and having a plurality of outputs for outputting at least one of said plurality of currents;

a winner-take-all (WTA) circuit unit receiving said plurality of currents from said input circuit for establishing a plurality of representing voltages corresponding thereto wherein the maximum one among said plurality of representing voltages generates a representing current controlled by a control terminal to be output on a VO terminal, and generating a plurality of first voltage output signals respectively corresponding to the received plurality of currents for indicating said maximum current; and a feedback control and voltage output unit having a clock terminal for receiving a clock signal, receiving said plurality of first voltage output signals from said winner-take-all circuit unit, generating a plurality of feedback control signals according to said plurality of first voltage output signals in one operation cycle controlled by said clock signal to control the outputs of said input circuit unit wherein one of said plurality of feedback control signals corresponding to the first voltage output signal indicative said maximum current is set inactive for guiding said input circuit unit to clear a corresponding input current, and converting said plurality of first voltage output signals to a plurality of second voltage output signals on said plurality of outputs in said operation cycle; a reset terminal being provided for receiving reset signals to reset said feedback control and voltage output unit.

8. The fuzzy processor as claimed in claim 7, wherein said membership function I/O circuit is enabled by activating a chip select signal to write said plurality of membership functions into said plurality of membership function memory units respectively.

9. The fuzzy processor as claimed in claim 8, wherein each one of said plurality of membership function memory units includes a plurality of static random access memory units.

10. The fuzzy processor as claimed in claim 9, wherein each one of said plurality of accumulators includes a plurality of storage units constructed by a Regulated-Gate Cascade structure.

11. An expanded fuzzy processor comprising a plurality of fuzzy processors as claimed in claim 7, wherein said reset terminals, said clock terminals and said VO terminals of said plurality of fuzzy processors are connected together respectively and wherein one of said control terminal of said fuzzy processor is set active and the others are set inactive.

* * * * *